Aug. 30, 1932.  C. G. GEIGNETTER  1,874,493
DUAL CONTROL BRAKES
Filed Sept. 9, 1930    3 Sheets-Sheet 1

INVENTOR
CHARLES G. GEIGNETTER
BY
ATTORNEY

Aug. 30, 1932.  C. G. GEIGNETTER  1,874,493
DUAL CONTROL BRAKES
Filed Sept. 9, 1930  3 Sheets-Sheet 2
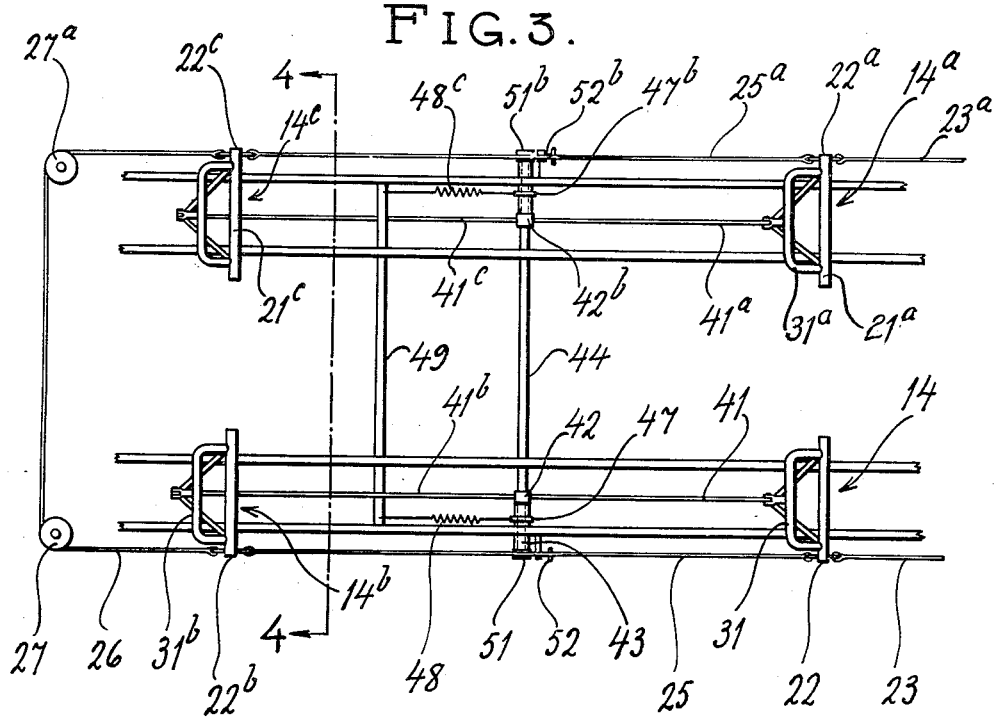
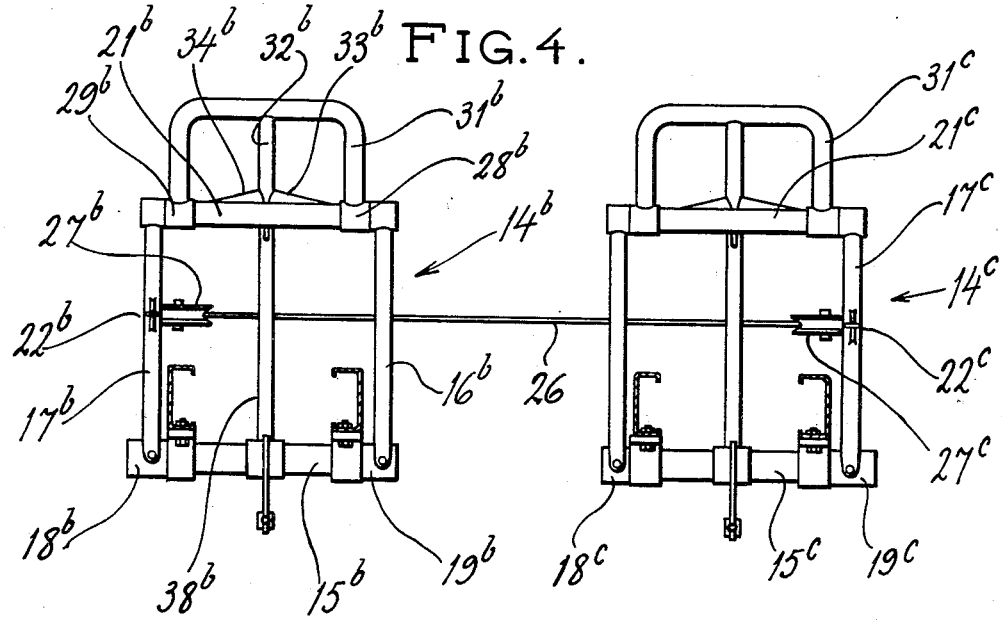
INVENTOR
CHARLES G. GEIGNETTER
BY
ATTORNEY

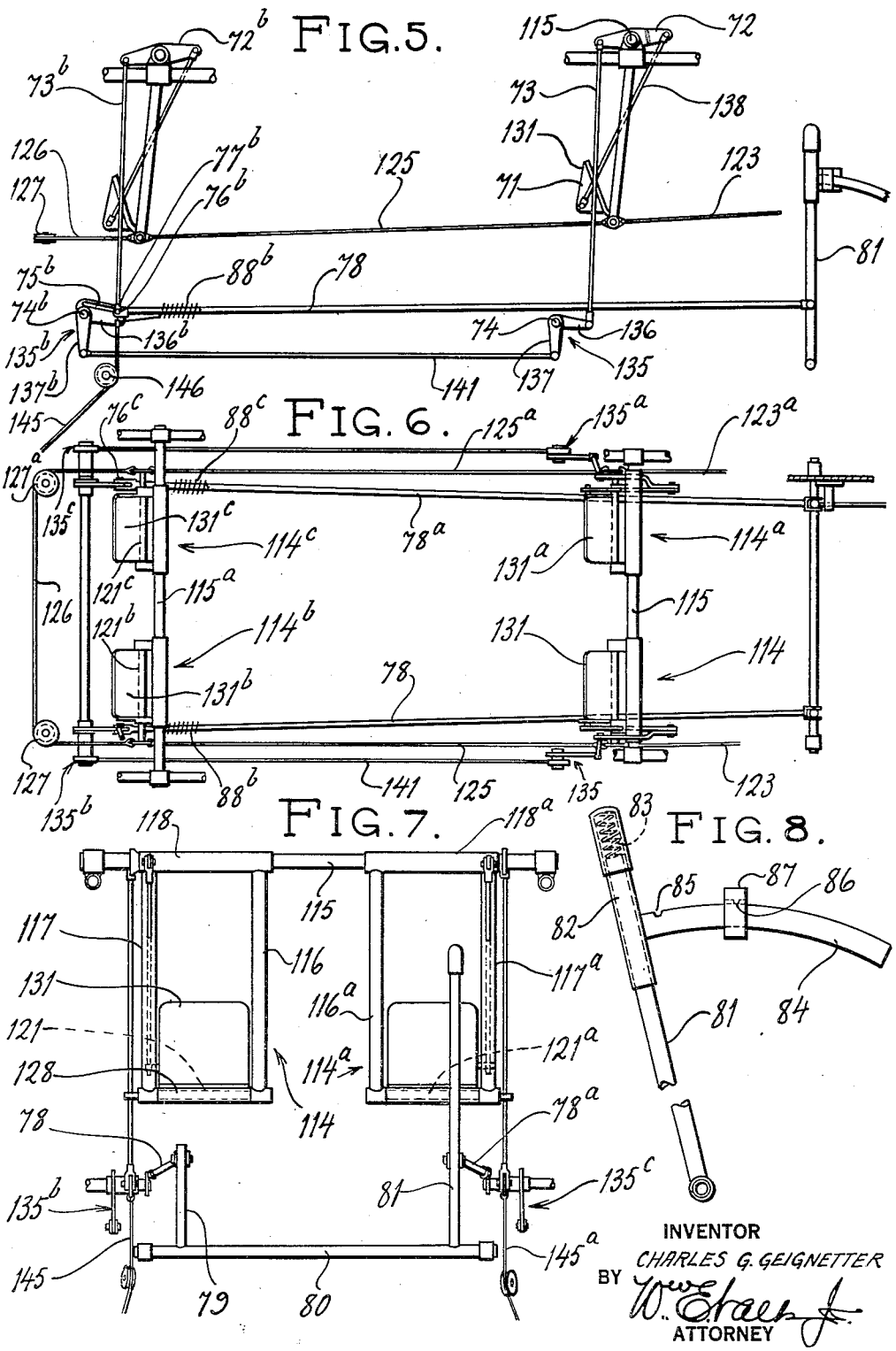

Patented Aug. 30, 1932

1,874,493

UNITED STATES PATENT OFFICE

CHARLES G. GEIGNETTER, OF HEMPSTEAD, NEW YORK, ASSIGNOR TO CURTISS AEROPLANE & MOTOR COMPANY, INC., A CORPORATION OF NEW YORK

DUAL CONTROL BRAKES

Application filed September 9, 1930. Serial No. 480,639.

This invention relates to airplanes and more particularly to brakes for the landing wheels thereof and to means for controlling said wheel brakes.

Prior to my invention airplanes have sometimes been equipped with hand operated brakes for the wheels of the landing gears thereof. Moreover, there have sometimes been provided brakes for the wheels controlled by foot pedals mounted on the same pedals as the rudder controls, but in devices of the last named character, the brakes have been operable only by a single operator.

One of the objects of my invention is to provide dual pedal controls for wheel brakes.

A further object of my invention is to provide such controls so designed that it is possible for the instructor to make the brake controls of the student pilot inoperative.

Further objects will be apparent from a reading of the subjoined specification and claims and from a consideration of the drawings.

In order to explain the invention more clearly, one embodiment thereof is shown in the accompanying drawings, in which:

Fig. 3 is a plan view also showing more or less diagrammatically the rudder and brake operating mechanism of Fig. 1;

Fig. 4 is sectional view taken substantially on the line 4—4 of Fig. 3;

Fig. 5 is a view in elevation showing more or less diagrammatically a modified form of device also constructed according to my invention;

Fig. 6 is a plan view of the device illustrated in Fig. 5;

Fig. 7 is a view in rear elevation of the device shown in Fig. 5; and

Fig. 8 is a view in elevation and on a somewhat enlarged scale showing the release lever by which the controls of one operator may be made inoperative.

In general, my invention is illustrated by an airplane equipped with a rudder and with two sets of rudder pedals for operating the rudder. Each rudder pedal assembly also includes an auxiliary pedal which may be moved relative to the assembly to exert tension upon a brake control cable and operate the brake for the corresponding landing gear wheel.

Figure 1:
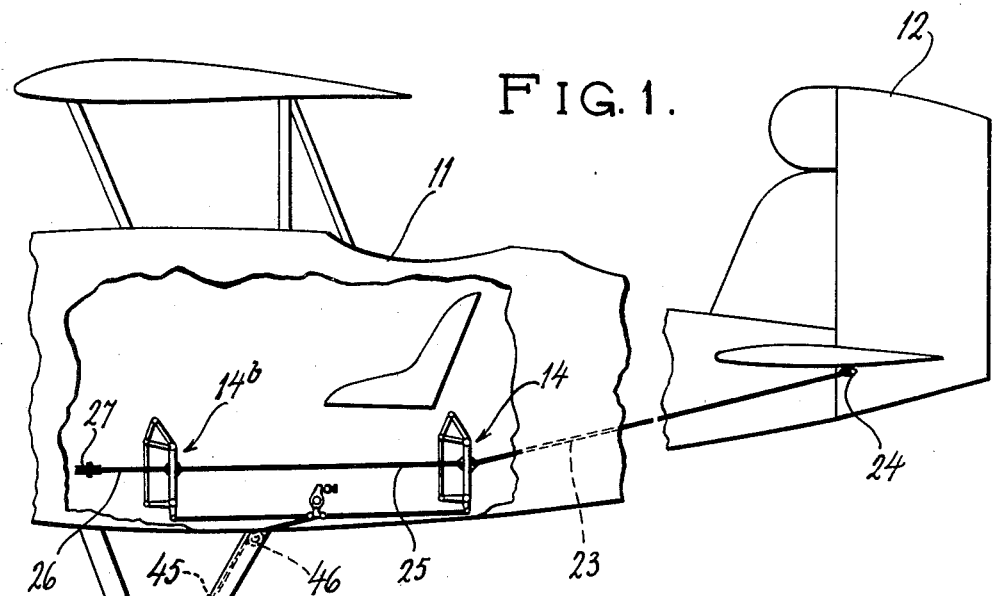
Fig. 1 is a view in elevation of an airplane, with parts broken away, illustrating diagrammatically the rudder controls and the brake controls.

Referring in detail to the drawings in which like numerals are used to indicate the same or similar parts, I have shown in Fig. 1 an airplane 11 equipped with a rudder 12 and with landing wheels of which the left landing wheel is shown at 13. The airplane is provided with a forward and a rear cockpit the former being intended for the student and the latter for the instructor. Each cockpit is provided with a pair of combined rudder and brake pedal assemblies of which the left and right in the rear cockpit are designated 14 and 14$^a$, respectively, and the left and right in the front cockpit are designated 14$^b$ and 14$^c$, respectively.

Each of these pedal assemblies is similarly constructed and a detailed description of one will be sufficient for all. The pedal assembly 14$^b$ is mounted for rotation on an axle 15$^b$ fixed to the frame work of the fuselage of the airplane. The pedal assembly includes a pair of normally upright, substantially parallel tubes 16$^b$ and 17$^b$ which are secured at their lower ends to sleeves 18$^b$ and 19$^b$ mounted on the axle 15$^b$. Secured to and joining the upper ends of tubes 16$^b$ and 17$^b$ is a horizontal tube 21$^b$. The sleeves 18$^b$ and 19$^b$ and the tubes 16$^b$, 17$^b$ and 21$^b$ comprise the parts of the assembly useful in controlling the rudder, the latter tube serving as a foot tread therefor. Secured to the tube 17 of the pedal assembly 14 as at 22 is a cable 23 which is connected to the rudder as at 24. Extending forward from 22 is a short cable 25 which is connected to the pedal assembly 14$^b$ as at 22$^b$. Also connected to the assembly 14$^b$ at 22$^b$ is another cable 26 which extends forward around a pulley 27, thence laterally around a pulley 27$^a$, and thence rearwardly to be joined to the pedal assembly 14$^c$ at 22$^c$. Also joined at 22$^c$ is a short cable 25$^a$ which is connected to the pedal assembly 14$^a$ at 22$^a$. Cable 23$^a$ extends rearward therefrom to the rudder 12. It may thus be seen that movement of the pedal 14 causes a similar movement of the pedal 14$^b$, an opposite movement of the pedals 14$^a$ and 14$^c$ and appropriate movement of the rudder 12, and that likewise, movements of the pedals 14$^a$, 14$^b$ and 14$^c$ cause corresponding movements of the other pedals and of the rudder.

Mounted on the axle 15$^b$ and the tube 21$^b$ is a parallelogram framework which constitutes the part of the pedal assembly devoted to the operation of the brake for the associated landing wheel. Mounted for rotation on the tube 21$^b$ are a pair of sleeves 28$^b$ and 29$^b$ to which are secured the opposite ends of an inverted U-shaped tube 31$^b$. Secured at approximately the center of the tube 31$^b$ and extending downward and forward therefrom is a tube 32$^b$ and joined to the lower end of the tube 32$^b$ are a pair of normally rearwardly extending tubes 33$^b$ and 34$^b$ which are joined at their opposite ends to the sleeves 28$^b$ and 29$^b$, respectively. It may thus be seen that the tubes 31$^b$, 32$^b$, 33$^b$ and 34$^b$ form a strongly braced triangular frame pivoted for rotation with the sleeves 28$^b$ and 29$^b$ about the tube 21$^b$. Pivoted on the rod 15$^b$ is a bell crank lever 35$^b$ having one arm 36$^b$ arranged in a plane substantially parallel with the plane of the tubes 33$^b$ and 34$^b$ and one arm 37$^b$ extending normally downward. A link 38$^b$ is pivotally connected to the junction of the tubes 32$^b$, 33$^b$ and 34$^b$ and is also pivotally connected to the outer end of said arm 36$^b$. By this parallelogram arrangement the rudder pedal assembly may be moved without corresponding movement of the bell crank lever 35$^b$ which operates the brake, or the brake controls may be operated without corresponding movement of the rudder controls.

The wheel 13 is provided with a brake 39 and the arms 37 and 37$^b$ of the bell crank levers 35 and 35$^b$ are connected thereto for operation of the brake. Pivotally connected to the arm 37 of the lever 35 is a link 41 which extends forward to and is pivotally connected with a lever 42 which is carried by a sleeve 43 on a stationary shaft 44. Also pivotally connected to the lever 42 is a link 41$^b$ which extends forward and is pivotally connected to the arm 37$^b$ of the lever 35$^b$. Connecting the lever 42 with the brake 39 is a cable 45 which passes intermediate its ends over a pulley 46.

Figure 2:
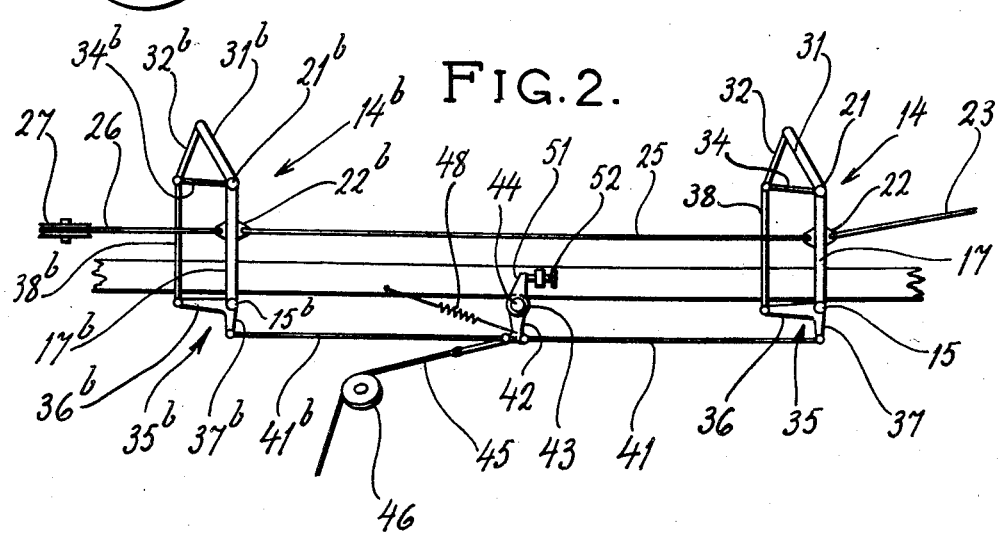
Fig. 2 is a view in side elevation and on an enlarged scale showing more or less diagrammatically the rudder and brake operating mechanism shown in Fig. 1.

Means are provided for resiliently maintaining the pedals 14 and 14$^b$ normally in such position that the brake 39 is released. The sleeve 43 also carries a lug 47 to which is attached a spring 48 fastened to a rod 49 secured to the fuselage. By this means the lever 42 is continuously urged to turn in a clockwise direction as shown in Fig. 2. This action continuously urges the links 41 and 41$^b$ forward and causes the lever 42, bell crank levers 35 and 35$^b$ and the brake pedal assemblies to tend to turn in a clockwise direction as seen in Fig. 2. This turning movement releases the cable 45 and the brake 39. A lug 51 secured to the sleeve 43 is adapted to contact with the adjustable screw 52 to limit the amount of the turning movement. The pedal assemblies 14$^a$ and 14$^c$ are similarly connected to operate the brake of the right landing wheel.

In the operation of the device described, pressure upon either of the tubes 21 or 21$^b$ of the rudder control pedal assemblies 14 or 14$^b$ causes a movement forward of the corresponding cable and movement of the rudder to turn the airplane in the desired direction. In a similar manner pressure on either of the tubes 21$^a$ or 21$^c$ causes a movement and turning in the opposite direction. Pressure by the toes, however, upon either of the tubes 31 or 31$^b$ causes a rotation of the brake parts of the pedal assembly, a rotation of the lever 42 which causes a pull to be exerted upon the cable 45 and an operation of the brake for the associated left landing wheel. Similarly, pressure by the toes upon either of the tubes 31$^a$ or 31$^c$ operates the brake for the associated right landing wheel.

In Figs. 5 to 8, inclusive, I have shown a modified form of my invention. Therein, also, means are provided for operating the rudder and brakes of the airplane. These means comprise pedal assemblies 114, 114$^a$, 114$^b$ and 114$^c$ connected to the rudder control cables 123, 125, 126, 123$^a$ and 125$^a$ and to brake control cables such as 145. The rudder cables pass around pulleys 127 and 127$^a$ and the brake cables pass around pulleys such as 146. All of the above designated parts are similar to corresponding parts of the embodiment previously described and operate similarly to the operation of previously described parts.

The pedals 114, 114$^a$, 114$^b$ and 114$^c$ are all similar to each other, but though they operate similarly to the corresponding pedals of the previously described embodiment, they differ somewhat in details therefrom. Inasmuch as all four of the pedals are alike, it is thought that a description of pedal assembly 114 will be sufficient for the understanding of all. Pedal assembly 114 comprises a sleeve 118 mounted upon a fixed shaft 115. Secured to the sleeve 118 for rotation therewith about the shaft 115 are a pair of downwardly extending substantially parallel tubes 116 and 117. Secured to the lower ends of the tubes 116 and 117 is a foot tread tube 121 and secured to said tread 121 are the cables 123 and 125. Thus it may be seen that pressure upon the foot tread 121 is effective to rotate the pedal assembly about the shaft 115 and to exert a pull upon the cable 123 for the operation of the rudder.

Mounted upon the foot tread 121 is a sleeve 128 and secured to the sleeve is a toe plate 131 which may be rotated with the sleeve 128 about the foot tread 121. Formed on the under side of the plate 131 is a bracket 71 and secured to the bracket 71 is a link 138 which extends upward and at its upper end is fastened to a rock lever 72 pivoted upon the fixed shaft 115. The opposite end of the lever 72 is pivotally secured to a downwardly extending link 73 whose lower end is fastened to the arm 136 of the bell crank lever 135. It may thus be seen that while movement of the foot tread 121 is effective to operate the rudder of the airplane, movement of the toe plate 131 relative to the tread 121 is effective to move the bell crank lever 135 and thus, as will be described later, is effective to operate the brake associated with said pedal. It may be noted that the arrangement insures a differential movement of the toe plate so that as the foot tread moves forward, the toe plate rotates clockwise (Fig. 5) about the foot tread so as to be maintained in the most convenient position.

The means by which the brake associated with the pedals is operated include the four pedal assemblies as previously described, the bell crank lever 135, a similar bell crank 135ª, and slightly different bell crank levers 135ᵇ and 135ᶜ. The bell crank lever 135 is pivoted on a fixed shaft 74 and the lower arm 137 of said bell crank lever is pivotally connected to a link 141 which extends forward and at its forward end is pivotally connected to the lower arm 137ᵇ of the bell crank lever 135ᵇ. The bell crank lever 135ᵇ is pivoted upon the fixed tube 74ᵇ and has its upper arm 136ᵇ formed with a slot 75ᵇ in which a pin 76ᵇ is adapted to slide. The link 73ᵇ by which the lever 72ᵇ is connected to the bell crank lever 135ᵇ carries at its lower end a yoke 77ᵇ which engages the pin 76ᵇ. Also connected to the pin 76ᵇ is a release rod 78 the operation of which will be later described. It is to be noted at this time, however, that the arms 136 and 136ᵇ in the normal released position of the brake are in an inclined position with the rear ends of the arms pointing slightly downward. Also secured to the upper arm 136ᵇ of the bell crank lever 135ᵇ is the cable 145 which leads to the brake for the left hand landing wheel. It is to be understood that the bell crank levers 135ª and 135ᶜ of the pedal assemblies 114ª and 114ᶜ are similarly connected to the brake for the right hand landing gear wheel.

As previously suggested, means are provided for releasing the brake control mechanism in the front cockpit so that the student pilot will have no control over the brakes. The link 78 which is connected at its forward end to the pin 76ᵇ extends rearward to a lever 79 (Fig. 7) which is secured to a torque tube 80 mounted in bearings in the fuselage of the airplane. Also secured to the torque tube 80 is an operating lever 81 by which the torque tube 80 may be rotated. Secured to the lever 81 is a link 78ª which extends forward to a pin 76ᶜ associated with the bell crank lever 135ᶜ. It may be thus seen that movement of the lever 81 forward will push the pins 76ᵇ and 76ᶜ forward to such a position at top dead center of the bell cranks that a force exerted upon the associated toe plates will be ineffective to move the bell crank levers 135ᵇ and 135ᶜ.

Means are provided for releasably locking the lever 81. Said lever 81 carries on its upper end a cap 82 which is urged upward by a spring 83 and the cap has secured to it a quadrant 84 formed with a notch 85 which is adapted to engage with a lug 86 formed on the guide 87. It may thus be seen that when the lever is in its rearward position, the spring 83 will urge the quadrant 84 upward so that the notch 85 will coact with the lug 86 to hold the lever releasably in its rearward position.

Springs 88ᵇ and 88ᶜ secured to bell crank levers 135ᵇ and 135ᶜ and to the links 78 and 78ª cooperate with the slope of the slot 75ᵇ and the slot in bell crank lever 135ᶜ to urge the links 78 and 78ª and the lever 81 forward. Therefore, if the pilot in the rear cockpit pushes down upon the cap 83 the lever 81 will be moved forward and the movement forward of the pins 76ᵇ and 76ᶜ will make the brake controls in the forward cockpit ineffective.

It is thought that the operation of this embodiment will be clear from the above description. Movement of either of the foot treads 121, 121ª, 121ᵇ or 121ᶜ will be effective to operate the rudder control cables and the rudder at all times. When the lever 81 is in its rearward position movement of any one of the toe plates 131, 131ª, 131ᵇ or 131ᶜ will be effective to apply the brake of the associated landing wheel. However, when the release lever 81 is moved to its forward position, though the pedals 131 and 131ª are effective to operate the brakes, the toe plates 131ᵇ and 131ᶜ will be ineffective to operate the brakes. The release of the lock 85—86 of the lever 81 by pushing down upon the cap 83 will be effective to cause the moving forward of the lever 81 and the release of the brake operating mechanism for the front cockpit.

It is to be understood that the above described embodiments of my invention are for the purpose of illustration only and various changes may be made therein without departing from the spirit and scope of the invention.

I claim as my invention:

1. In an airplane, a front cockpit and a rear cockpit, a pair of landing wheels, a brake for each of said wheels, means positioned in the rear cockpit for controlling both said brakes, means positioned in the front cockpit for controlling both said brakes, and means positioned in one said cockpit for making the controlling means of the other cockpit ineffective.

2. In aircraft, a rudder, a plurality of rudder pedals, a landing wheel, a brake for said wheel, means associated with each pedal for moving said rudder, means associated with each pedal for controlling said brake, and means adjacent to one of said pedals for making the brake control associated with another said pedal ineffective.

3. In aircraft; a rudder; a plurality of rudder pedals; a landing wheel; a brake for said wheel; means associated with each pedal for moving said rudder; means associated with each pedal for controlling said brake; and means adjacent to one of said pedals for making the brake control associated with another said pedal ineffective, said last named means comprising a bell crank lever having a slot in one arm thereof, a pin positioned in said slot, a connection secured to said pin, a second connection secured to the other arm of said bell crank lever, and means for moving said pin along said slot from a position adjacent one end of the bell crank lever arm to a position adjacent the axis of the bell crank lever.

4. In aircraft; a pair of foot pedal assemblies, each foot pedal assembly including a bell crank lever; another lever positioned intermediate said bell crank levers; a connection extending from one bell crank lever to said intermediate lever, a member extending from the other bell crank lever to said intermediate lever, a control cable connected to said intermediate lever and resilient means tending to rotate said intermediate lever.

5. In aircraft, a pair of foot pedal assemblies, and a connection between said foot pedal assemblies, said connection including a bell crank lever having an arm formed with a slot, a pin positioned within said slot, a link attached to said pin and to one of the foot pedal assemblies, and means for making said connection ineffective comprising an additional member attached to said pin for moving said pin from a position in said slot adjacent one end of the arm to a position adjacent the axis of the bell crank lever whereby the link is moved from a position in which it is effective to rotate the bell crank lever to a position in which it is ineffective to do so.

6. In arcraft; a brake; a pair of control levers, one adapted at all times to control said brake and the other adapted at times to control said brake; a connection extending between said control levers, said connection including a bell crank lever having an arm formed with a slot, a pin positioned within said slot, a link attached to said pin and to said second named control lever, a link connecting the other arm of said bell crank lever and said first named control lever, means connecting said bell crank lever and said brake, and means operative at times for making said second named control lever ineffective comprising an additional member attached to said pin for moving said pin from a position in said slot adjacent one end of the arm to a position adjacent the axis of the bell crank lever.

7. In aircraft having a pair of landing wheels, a brake for each wheel, two pairs of controls for said brakes, and separate means adjacent one said pair of controls selectively operable to either render both said pairs of controls or one said pair of controls effective.

In testimony whereof I hereunto affix my signature.

CHARLES G. GEIGNETTER.